United States Patent [19]

Rodgers, Jr.

[11] Patent Number: 5,772,558

[45] Date of Patent: *Jun. 30, 1998

[54] STATIONARY EXERCISE APPARATUS

[75] Inventor: Robert E. Rodgers, Jr., Houston, Tex.

[73] Assignee: CCS, LLC, Broomfield, Colo.

[ * ] Notice: The term of this patent shall not extend beyond the expiration date of Pat. No. 5,549,526.

[21] Appl. No.: 665,399

[22] Filed: Jun. 18, 1996

Related U.S. Application Data

[63] Continuation of Ser. No. 426,467, Apr. 19, 1995, Pat. No. 5,549,526, which is a continuation-in-part of Ser. No. 377,846, Jan. 25, 1995, Pat. No. 5,518,473.

[51] Int. Cl.⁶ .......................... A63B 69/16; A63B 22/04
[52] U.S. Cl. ............................................... 482/51; 482/70
[58] Field of Search .................................. 482/51, 52, 57, 482/70, 53, 58, 110, 71

[56] References Cited

U.S. PATENT DOCUMENTS

| | | |
|---|---|---|
| 219,439 | 9/1879 | Blend . |
| 2,603,486 | 7/1952 | Hughes . |
| 3,316,898 | 5/1967 | Brown . |
| 3,432,164 | 3/1969 | Deeks . |
| 3,759,511 | 9/1973 | Zinkin et al. . |
| 4,023,795 | 5/1977 | Pauls . |
| 4,053,173 | 10/1977 | Chase, Sr. . |
| 4,188,030 | 2/1980 | Hooper . |
| 4,379,566 | 4/1983 | Titcomb . |
| 4,456,276 | 6/1984 | Bortolin . |
| 4,509,742 | 4/1985 | Cones . |
| 4,555,109 | 11/1985 | Hartmann . |
| 4,561,318 | 12/1985 | Schirrmacher . |
| 4,645,200 | 2/1987 | Hix . |
| 4,679,786 | 7/1987 | Rodgers . |
| 4,720,093 | 1/1988 | Del Mar . |
| 4,869,494 | 9/1989 | Lambert, Sr. . |
| 4,900,013 | 2/1990 | Rodgers, Jr. . |
| 4,949,954 | 8/1990 | Hix . |
| 4,949,993 | 8/1990 | Stark et al. . |
| 4,989,857 | 2/1991 | Kuo . |
| 5,039,087 | 8/1991 | Kuo . |
| 5,039,088 | 8/1991 | Shifferaw . |
| 5,131,895 | 7/1992 | Rodgers, Jr. . |
| 5,135,447 | 8/1992 | Robards, Jr. et al. . |
| 5,186,697 | 2/1993 | Rennex . |
| 5,242,343 | 9/1993 | Miller . |
| 5,290,211 | 3/1994 | Stearns . |
| 5,295,928 | 3/1994 | Rennex . |
| 5,299,993 | 4/1994 | Habing . |
| 5,383,829 | 1/1995 | Miller . |
| 5,401,226 | 3/1995 | Stearns . |
| 5,423,729 | 6/1995 | Eschenbach . |
| 5,549,526 | 8/1996 | Rodgers .................................... 482/57 |

FOREIGN PATENT DOCUMENTS 2919494  5/1979  Germany .

*Primary Examiner*—Stephen R. Crow
*Attorney, Agent, or Firm*—Dorsey & Whitney LLP

[57] ABSTRACT

A stationary exercising device which promotes cardiovascular exercise yet minimizes impact to critical joints, particularly the ankles and knees. A frame supports a linkage assembly having at least one linkage member with a camming surface. The linkage assembly is in turn connected to a coupling system attached to the frame. Structure is included which permits each foot of the user to move the linkage assembly in such a manner as to generate a preferred closed path movement for the foot in a preferred anatomical pattern minimizing unnecessary stress in the joints yet permitting a cardiovascular workout.

8 Claims, 5 Drawing Sheets

STATIONARY EXERCISE APPARATUS

CROSS REFERENCE TO RELATED APPLICATIONS

This application is a continuation of U.S. application Ser. No. 08/426,467 filed Apr. 19, 1995 for Stationary Exercise Apparatus now U.S. Pat. No. 5,549,526. That application was a continuation-in-part of U.S. application Ser. No. 08/377,846 filed Jan. 25, 1995, now U.S. Pat. No. 5,518,473.

BACKGROUND OF THE INVENTION

1. Field of the Invention

The present invention relates to an improved stationary exercising apparatus. More particular, the invention relates to an improved exercising apparatus which enables the user to move his feet in a predetermined closed path which more accurately represents the body motion associated with climbing stairs or an inclined ramp.

2. Description of the Prior Art

Stair climbing is a popular form of exercise for the cardiovascular system. However, it can over prolonged use overstress the ankles, knees and other joints. Walking is also a popular form of exercise but it does not load the cardiovascular system to the extent stair climbing does. Therefore, the need exists for an improved stationary exercising device which will load the cardiovascular system as stair climbing does but does not overload or unduly stress the ankles, knees and other joints. Prior art stair climbing devices have two common draw backs. First, they require excessive lifting of the knees or an exaggerated vertical movement of the lower legs. See, for example, U.S. Pat. Nos. 3,316,898; 4,949,993; 4,989,857; and 5,135,477. Alternatively, the devices which do tend to promote a more natural movement of the knees and ankles are difficult to ascend and descend because of the configuration of the devices. See, for example, U.S. Pat. No. 5,242,343.

Hence, the need exists for an improved stationary exercise device which promotes the movements of the feet, ankles and legs in a more natural and rhythmic motion.

SUMMARY OF THE INVENTION

Briefly, the invention relates to an improved stationary exercising device. A frame is provided which includes a base portion adapted to be supported by the floor, a mid portion and a top portion. A coupling member is attached to the frame which includes a pulley defining a pivot axis. Two reciprocating members are positioned in spaced relationship to the base portion of the frame. In the preferred embodiment, each reciprocating member includes a forward camming portion and is supported proximate the forward end by the base portion. Preferably, the camming portion is curved in shape. The other end of each reciprocating member is attached, directly or indirectly, to the pulley of the coupling member. In this manner, rotation of the pulley rotates one end of each reciprocating member in an orbital path while the other end of each reciprocating member moves in a predetermined path defined by the camming portion. Means are also included for supporting or orienting the bottom of each foot of the user so that each foot follows a predetermined closed path which may conform to a flattened circular path. Such a path permits cardiovascular exercising yet minimizes stress on the joints.

In an alternate embodiment, the means for orienting the bottom of the foot includes a linkage assembly for each reciprocating member. Each such linkage assembly comprises at least one link which is pivotally connected proximal one end between the two ends of the reciprocating member, closest to the end that is being displaced along the floor. This additional linkage is restrained at its other end within a curved track which is attached to the frame, permitting the second end of the link to move along an arcuate path defined by the curved track.

In yet another alternate embodiment, the means for orienting the bottom of the foot also includes a linkage assembly for each reciprocating member. Each such linkage assembly comprises a link which is pivotally connected proximal one end between the two ends of the reciprocating member, closest to the end that is being displaced along the floor. This link includes a curved portion which acts as a camming surface at its other end and moves along a roller attached to the frame. The camming surface serves to control the foot angle. In this manner the linkage assembly serves to help define a predetermined closed path for the movement of the foot pad as it moves relative to the frame. Preferably, the path is a flattened circular path which minimizes stress on the joints yet permits cardiovascular exercising.

In yet a further embodiment of the present invention, the means for orienting the bottom of the foot also includes a linkage assembly for each reciprocating member. Each such linkage assembly comprises a link which is pivotally connected proximal one end between the two ends of the reciprocating member, closest to the end that is being displaced along the floor. The other end of the link is pivotally connected to one end of an arm member. The other end of the arm member is pivotally connected to the top portion of the frame. The base portion of the frame includes a curved section over which the first end of each reciprocating member rides as it is displaced in a generally linear motion. Thus, the linkage assembly serves to help define a predetermined closed path for the movement of the foot pad as it moves relative to the frame. In addition, the movement of the link of the linkage assembly serves to assist to rotate the arm member about the pivoted connection to the top portion of the frame, thereby providing enhanced exercising for the upper body muscle groups.

The more important features of this invention have been summarized rather broadly in order that the detailed description may be better understood. There are, of course, additional features of the invention which will be described hereafter and which will also form the subject of the claims appended hereto.

BRIEF DESCRIPTION OF THE DRAWINGS

In order to more fully describe the drawings used in the detailed description of the present invention, a brief description of each drawing is provided.

DETAILED DESCRIPTION OF PRESENT INVENTION

Figure 1:
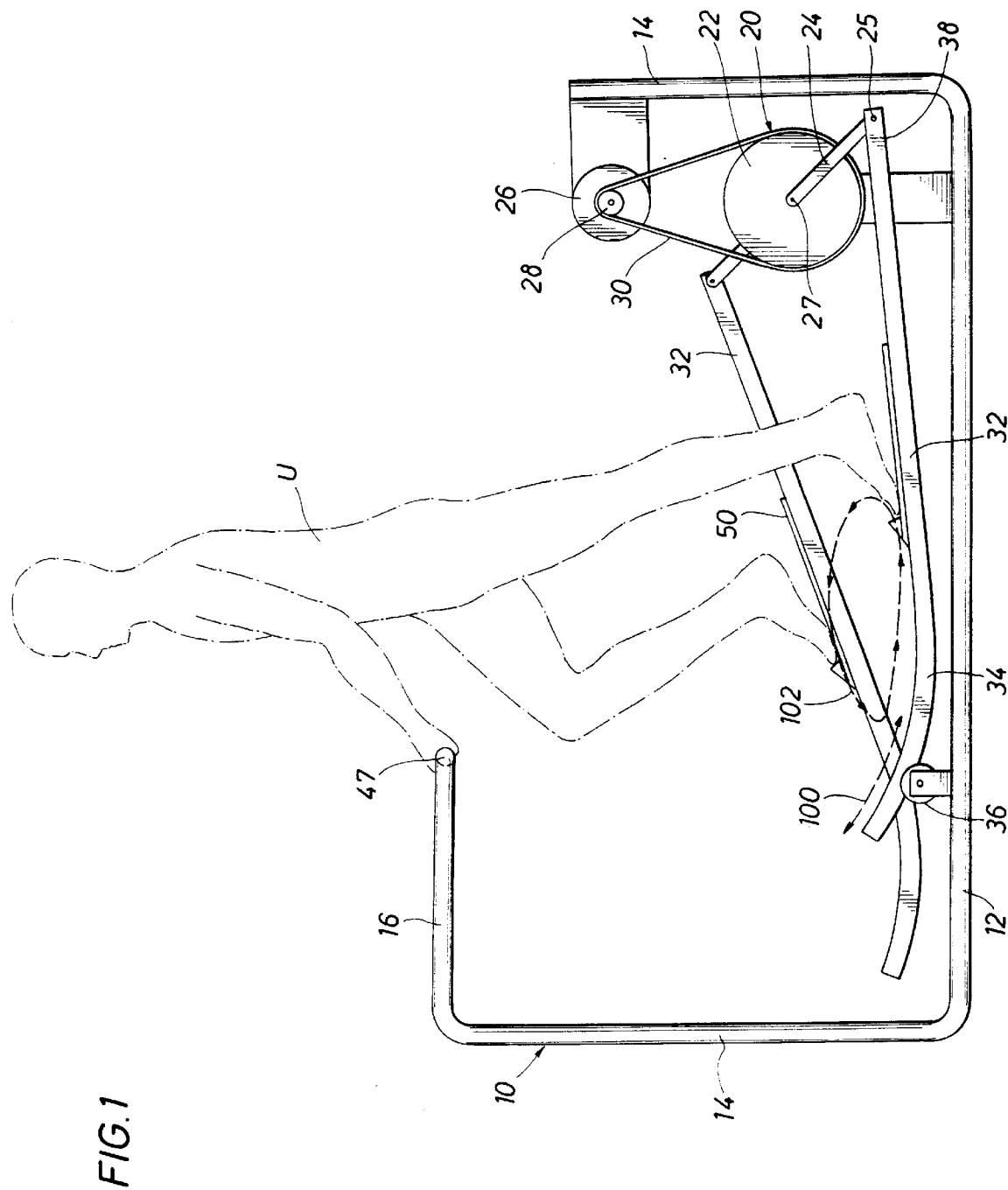
FIG. 1 is an elevation view of the preferred embodiment of the present invention.
Figure 2:
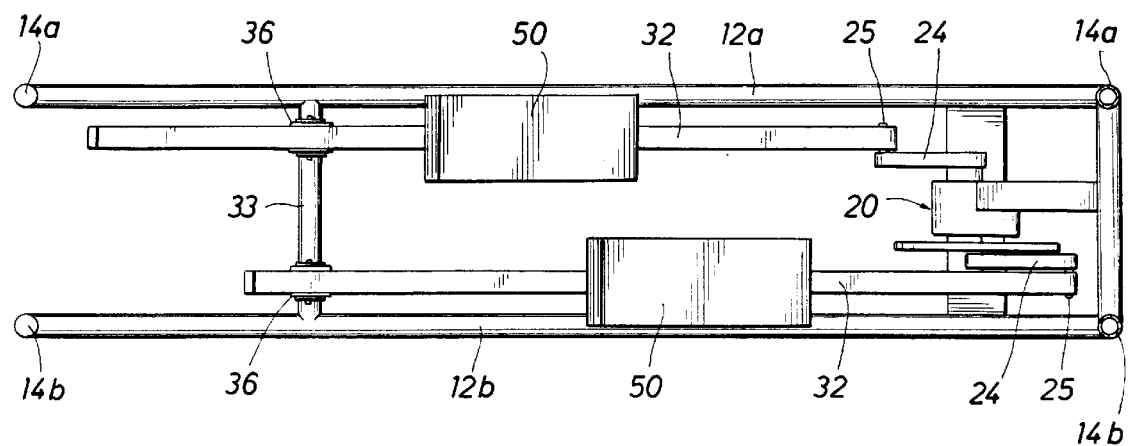
FIG. 2 is a plan view of the preferred embodiment of the present invention.

Referring to FIGS. 1 and 2, a frame 10 is shown comprising a base portion 12, a mid portion 14, and a top portion 16. Referring briefly to FIG. 2, the frame 10 comprises two bottom portions 12a and 12b, two mid portions 14a and 14b, and two top portions. In essence, the frame is comprised of two separate bents "a" and "b". Obviously, variations can be made to frame 10 as disclosed without departing from the spirit of the invention.

A coupling system 20 is fixed relative to the frame and comprises a pulley 22 and crank members 24. A resistant brake system 26 is also shown which includes a sheave 28 and a belt 30. Two reciprocating members 32 are positioned in the lower proximity of frame 10. Each reciprocating member 32 has a camming portion 34 which is adapted to ride on a roller 36 attached to base 12. As shown the camming surface may be curved. The other end 38 of each reciprocating member 32 is pivotally connected to one end of a crank 24. The pivotal connection at end 38 may be through a pivotal connection member 25 (see FIG. 2) which extends between the other ends 38 of reciprocating members 32 and cranks 24. The other end of crank 24 is attached to pulley 22 at the pivot axis 27 of the coupling system 20. The pivot axis 27 is the axis about which pulley 22 rotates.

A foot pad 50 is attached to the top surface of each arm 32 to support and orient a foot of the user. The top portion 16 of frame 10 includes a handle portion 47 which the user grabs for stability during exercising.

Referring to FIG. 2, it can be easily seen that the frame 10 comprises dual base portions 12a/12b, mid portions 14a/14b and top portions. Furthermore, it can been seen that the reciprocating members 32 provide an identical dual system; each system resting on a base portion 12a or 12b of the system and each arranged to accommodate one foot and one arm of the user. Each bent ("a" and"b") is connected by cross members, such as 33.

In the operation of the preferred embodiment the user "U" ascends the present invention from the back or the sides which facilitate its use and begins a climbing motion which results in the displacement of each reciprocating member 34 in the direction of arrow 100 at the camming portion 34. Similarly, an orbital motion occurs at the second end 38 of each reciprocating member 32. However at points between the opposite ends of each reciprocating member 32, the motion gradually changes from the orbital motion which in the preferred embodiment is a circular motion (at ends 38) to an arcuate motion at portions 34. This geometric transition results in a predetermined closed path which preferably is a flattened circle configuration 102 at foot pads 50. This provides a more natural and rhythmic movement for the feet, ankles and legs. In this manner the user can achieve the superior cardiovascular workout associated with a stair climber but without the awkward and unnatural movement of the feet, ankle, knees and legs associated with prior art devices.

Resistant brake system 26 operates in a manner well known to those skilled in the art. Resistant brake 26 serves to increase or decrease the load on the pulley through the sheave 28/belt 30 arrangement. Thus, resistant brake 26 serves to increase or decrease the extent of the cardiovascular workout.

Figure 3:
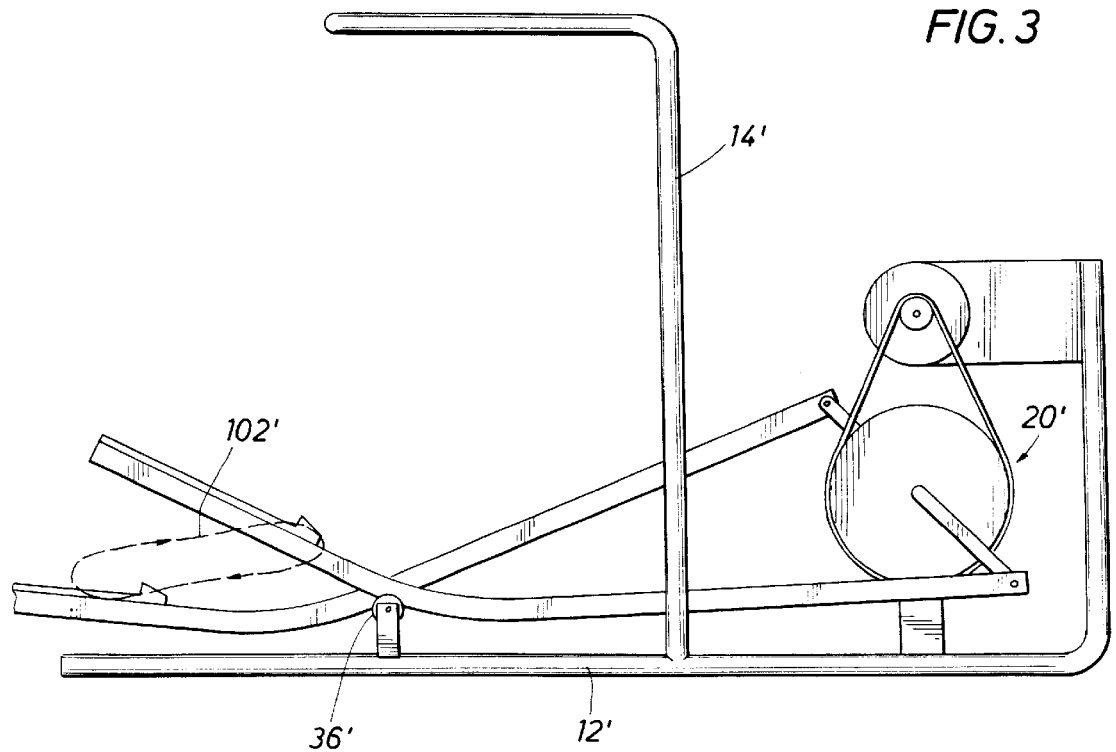
FIG. 3 is an elevation view of an alternate embodiment of the present invention.

Referring to FIG. 3, an embodiment is shown which is identical to the preferred embodiment of FIG. 1 except that the frame includes a mid portion 14' which ascends proximate the center of the base portion 12'. In this orientation, the user "U" would face a direction opposite from that shown in FIG. 1. In this configuration, the roller 36' is repositioned closer to the coupling system 20' and the resulting circular path 102' assumes a flatter profile. The embodiment shown in FIG. 3 with the flatter profile 102' permits cardiovascular exercising with minimal stress on the joints due to the preferred anatomical pattern.

Figure 4:
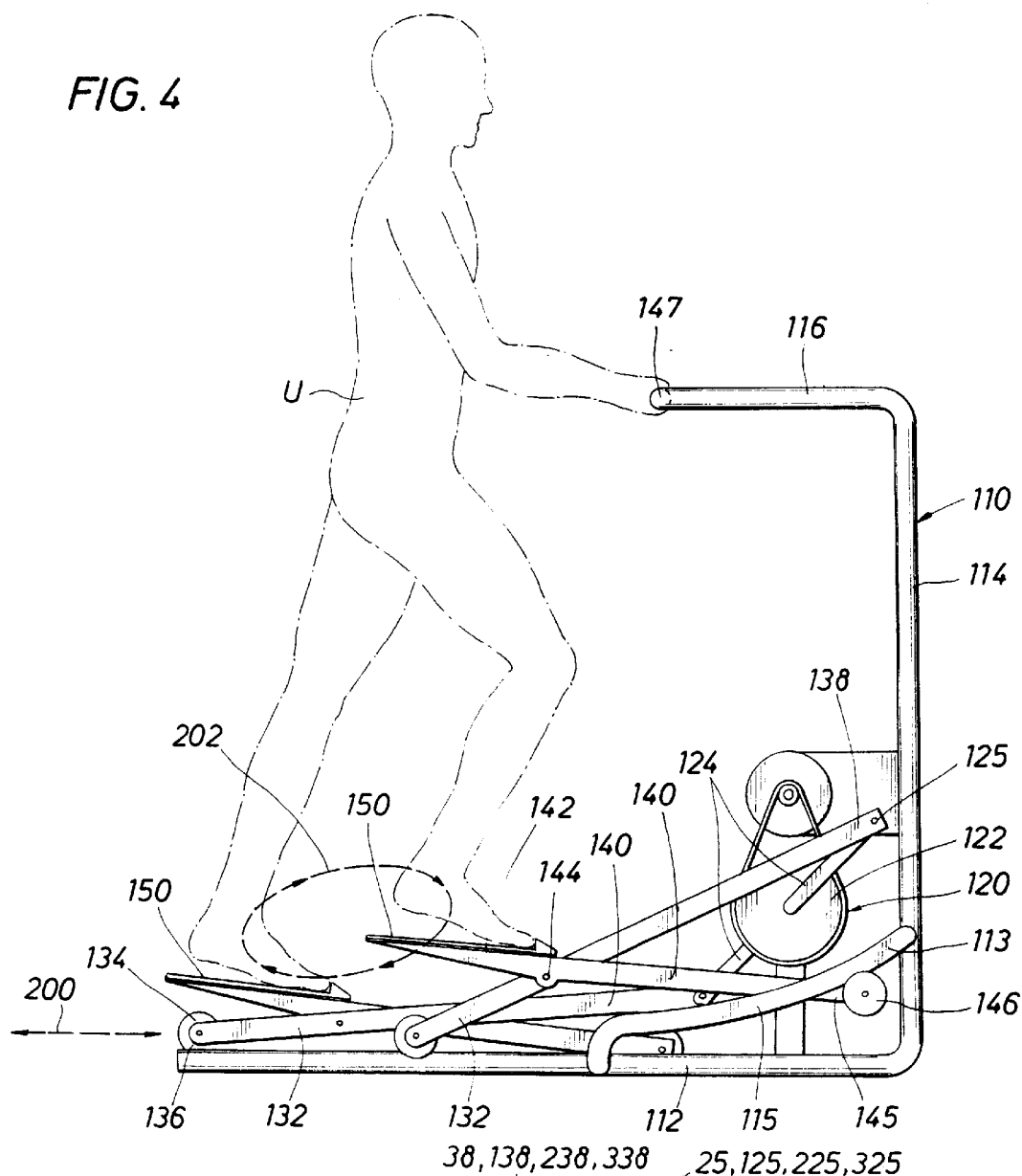
FIG. 4 is an elevation view of another alternate embodiment of the present invention.

Referring now to FIG. 4, an alternate embodiment of the present invention is shown. For this embodiment, identical two-digit reference numerals will be used to designate similar structure found in the preferred embodiment but with a 100 series prefix. Frame 110 comprises a lower portion 112, a mid portion 114, and a top portion 116. A coupling system 120 is included having identical components of the coupling system 20 described above for the preferred embodiment. Furthermore, coupling system 120 performs in an identical manner to coupling system 20 described above for the preferred embodiment.

A pair of reciprocating members 132 are also included, each having a first end 134 on which rollers 136 are mounted. The second end 138 of each reciprocating member 132 is pivotally connected via a pin member 125 to one end of each crank 124. Two foot members 140 are included in this alternate embodiment, each being pivotally connected proximate a first end 142 at a pin connection 144 to a corresponding reciprocating member 132. Each foot member 140 also includes a foot pad 150 attached to the top surface of each foot member 140 at first end 142. In this embodiment, a roller 146 is attached to each foot member 140 at its second end 145. Each roller 146 engages a bar 113 of each bent of frame 110. Each bar 113 is connected at each end to frame 110 and includes an curved camming portion 115. Thus, each bar 113 acts as a track to guide the second end 145 of each foot member 140 by means of a roller 146. In addition, the top portion 116 of each bent of frame 110 includes a handle 147 adapted to be held by the user during exercising to provide stability.

In the operation of this alternate embodiment, the user "U" ascends the device from the side or the rear with ease, places both feet on pads 150, grabs bar 147 and begins a climbing motion. At that point, first ends 134 of each foot member 140 are displaced in a linear manner in the direction of arrow 200. As in the case of the preferred embodiment, ends 138 of each reciprocating member 132 move in an orbital and preferably a circular motion about pulley 122. The change from a linear movement at first ends 134 of reciprocating members 132 to a circular movement of second end 138 of reciprocating member 132 coupled with the influence of an arcuate movement of ends 145 of foot members 140 results in a generally flattened circular motion as shown by path 202.

Figure 5:
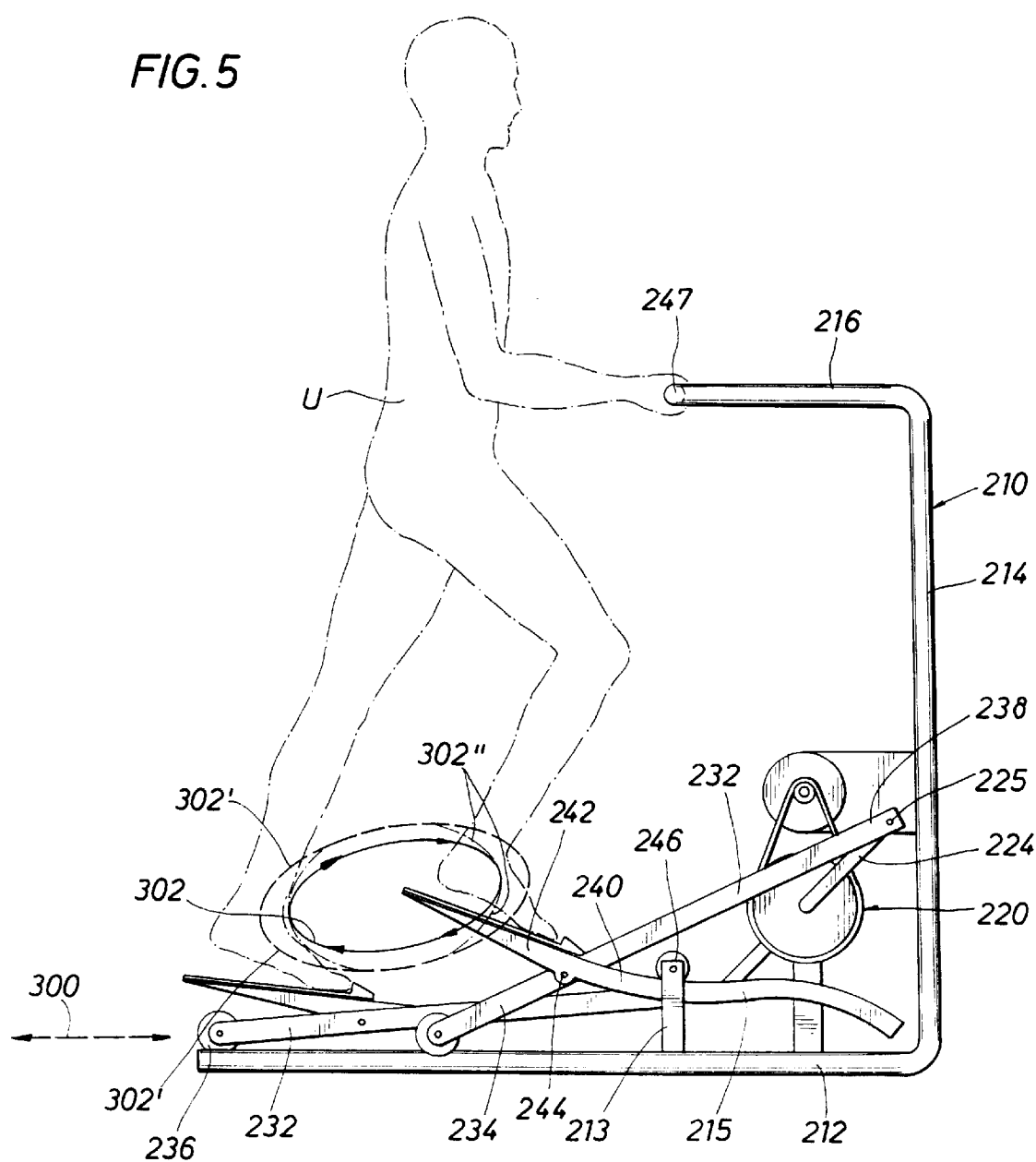
FIG. 5 is an elevation view of yet another alternate embodiment of the present invention.

Referring now to FIG. 5, another alternate embodiment of the present invention is shown. As before, similar parts will be designated by the same two-digit reference numeral as shown in the preferred embodiment but now with a 200 series prefix. Frame 210 again comprises a base portion 212, a mid portion 214 and a top portion 216. A coupler system 220 is also provided which is identical in structure and function to coupling system 20 of the preferred embodiment (FIGS. 1–2). This alternate embodiment also includes a pair of reciprocating members 232, each having a first end 234 which moves linearly in the direction of arrow 300 by means of rollers 236. As in the case of the previous embodiments, rollers 236 are shown engaging bottom portion 212 of the frame; however, they may slide along the floor rather than the base of the frame. Similarly, each reciprocating member 232 includes a second end 238 pivotally attached to one end of a crank 224. In this alternate embodiment two foot members 240 are included having a foot portion 250. Each foot member 240 is pivotally connected at a pin connection 244 proximate a first end 242 of a foot member 240 to a corresponding reciprocating member 232. Approximately ½ to ⅓ the length of each foot member 240 comprises a camming portion 215, which may be curved as shown. A roller 246, which is secured to base 212 by vertical member 213, rides along the upper surface of the curved portion 215 of each foot member 240 during the operation of the present invention. Thus, each roller 246 serves to vertically restrain the curved portion 215 of each member 232.

In the operation of this alternate embodiment, the user "U" ascends the device from the side or the rear grabs the handles 247 and begins a climbing motion. As the user begins the climbing motion, ends 234 of each reciprocating member move in a linear motion in the direction of arrow 300 and ends 238 of each reciprocating member 232 move in an orbital and preferably a generally circular motion. In view of the shaped or curved portion 215 of each foot member 240, the lateral displacement of ends 234 of each reciprocating member and the orbital motion at ends 238, a predetermined closed path is defined preferably a flattened circular profile 302 as shown.

Figure 6:
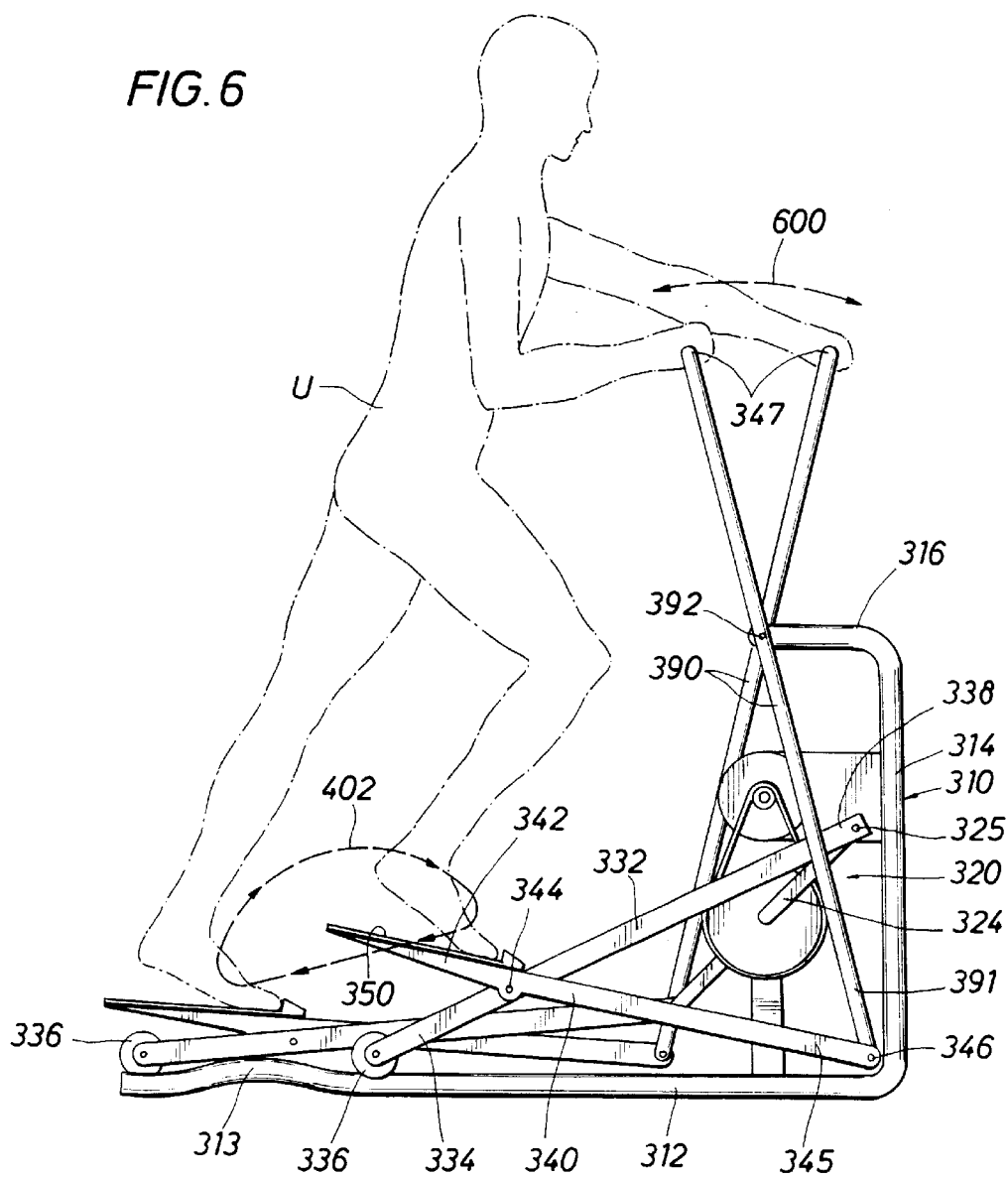
FIG. 6 is an elevation view of yet a further alternate embodiment of the present invention.

Referring now to FIG. 6, yet another alternate embodiment of the present invention is shown. As before, similar parts will be designated by the same two digit reference numeral as shown in the preferred embodiment, but now with a 300 series prefix. Frame 310 again comprises a base portion 312, a mid portion 314 and a top portion 316. A coupling system 320 is also provided which is identical in structure and function to the coupling system 20 of the preferred embodiment (FIGS. 1–2). This alternate embodiment also includes a pair of reciprocating members 332, each having a first end 334 which moves along the base 312 in a generally linear direction on rollers 336. In this alternate embodiment, a portion of the base 312 includes a curved profile 313 proximate that portion of the base in contact with rollers 336 of reciprocating members 332. Each reciprocating member 332 includes a second end 338 pivotally attached to one end of a crank 324. Again in this alternate embodiment, two foot members 340 are included having a foot portion 350. Each foot member 340 is pivotally connected at a pin connection 344 proximate a first end 342 of a foot member 340. The other end 345 of each foot member 340 is pivotally connected to an arm member 390. One end 391 of rod arm member 390 is attached at the pivotal connection 346 while the arm member 390 is pivotally restrained proximate its other end at a pivotal connection 392 to the top portion 316 of frame 310. Each arm is pivotally connected at connection 392 to the top portion 316 of frame 310. A handle portion 347 is included at one end of each arm member 390.

Thus, in the operation of the embodiment shown in FIG. 6, the user "U" ascends the apparatus and begins a climbing motion by exerting pressure on pads 350 and by beginning an oscillating motion of handles 347 of arm members 390 in the direction of arrow 600. In this manner, the movement of the feet on foot pads 350 move in a predetermined closed path 402. The curved portion 313 of each bent of base portion 312 act as a camming surface and influences the closed profile of closed path 402.

That is, the curved portions 313 serve to flatten the lower portion of path 402 so that it more accurately resembles a walking motion. Concurrently, the user is oscillating handles 347 in the direction of arrow 600 thereby achieving an enhanced cardiovascular exercise.

As a result, muscle groups of the upper body are exercised as a result of the oscillating motion of arm members 390.

It should be understood that while only FIG. 6 illustrates arm members 390 attached to a linkage assembly to exercise the upper body muscle groups, such an adaptation is possible for each of the embodiments illustrated herein, particularly in view of the detail description of U.S. patent application Ser. No. 08/377,846.

Figure 7:
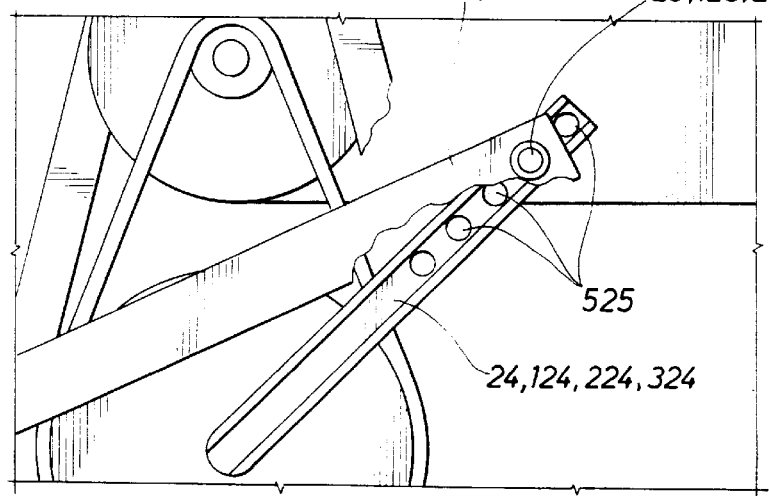
FIG. 7 is a detailed view of a portion of the present invention.
Figure 8:
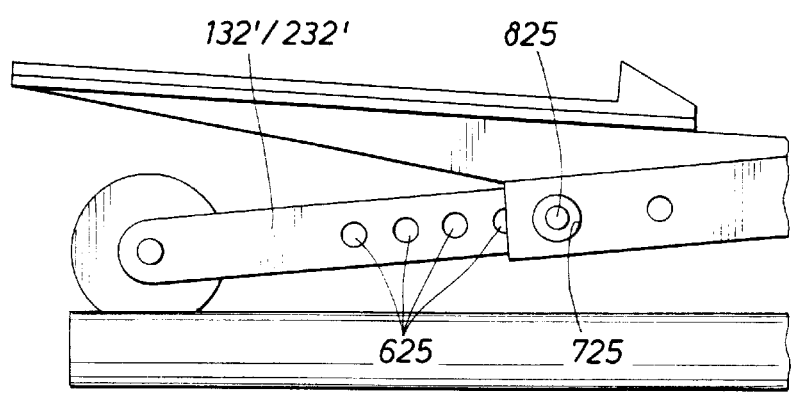
FIG. 8 is another detailed view of a portion of the present invention.
Figure 9:
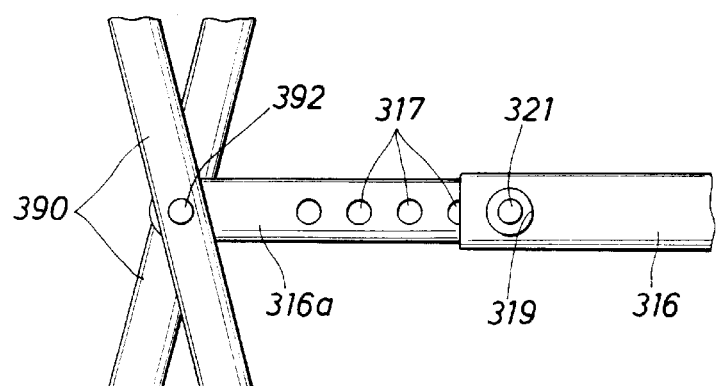
FIG. 9 is yet another detailed view of a portion of one of the alternate embodiments of the present invention.

FIGS. 7–9 are detailed views of portions of the preferred and alternate embodiments which illustrate the adjustable nature of certain elements. The adjustability of certain linkages will modify the geometric configuration of the closed path which is advantageous to accommodate different sized users or to create a particular configuration of closed path.

Referring to FIG. 7, each crank member 24 may include a series of apertures 525 through which pivotal connection member 25/125/225/325 may pass. Thus, as an operator readjusts the end 38/138/238/338 of reciprocating member 32/132/232/332 in a radially outwardly direction toward the outward aperture 525, the generally flattened circular path 102/202/302/402 will assume a proportionally larger closed path, as shown by phantom lines 302' in FIG. 5.

Referring to FIG. 8, the first end 134/234 of each reciprocating member 132/232 is shown having a telescoping portion 132'/232' with apertures 625. The other portion of each reciprocating member would include an aperture 725 adapted to be aligned with a particular aperture 625 so that a pin connection 825 can be passed through, thereby extending or shortening each reciprocating member 132/232. In this manner, the operator can alter the configuration of the path 202/302/402 of the alternate embodiments. If the overall length of each reciprocating member 132/232/332 is extended by inserting a pin 825 in aperture 625 located closest to the coupling system 20 as shown in FIG. 8, the height of the closed path 382 is increased but the length is not affected, as shown by phantom line 302" in FIG. 5.

Referring now to FIG. 9, a detailed view is shown of a portion of the alternate embodiment depicted in FIG. 6. Specifically, top portion 316 also includes a second member 316a which telescopes therein. Member 316 includes a plurality of apertures 317. Top portion 316 also includes an aperture 319. In this manner, the user may adjust portion 316a within top portion 316 and fasten the two portions together by means of a pin member 321 which passes through aperture 319 and one of the selected apertures 317. Thus, the length of top portion 316, can be adjusted so that handles 347 are more easily reached by the user.

An improved stationary exercising device is disclosed which maximizes cardiovascular exercise yet minimizes stress on critical joints, particularly the ankles and knees. Obviously, modifications and alternations to the embodiments disclosed herein will be apparent to those skilled in the art in view of this disclosure. However, it is intended that all such variations and modifications fall within the spirit and scope of this invention as claimed.

What is claimed is:

1. An apparatus for exercising comprising:
   a frame having a base portion adapted to be supported by a floor;
   first and second reciprocating members, each reciprocating member having a first end and a second end, said first ends of said first and second reciprocating members having a camming portion including a curved profile portion and adapted to engage said base portion at said curved profile portion;

a coupling member having (i) a pulley supported by said frame defining a pivot axis, and (ii) means for attaching said second ends of said first and second reciprocating members to said pulley so that rotation of said pulley results in the rotation of said second ends of said first and second reciprocating members in a substantially circular path about said pivot axis; and means operatively associated with said reciprocating members for supporting the bottom of the foot of the user of the apparatus so that during operation of the apparatus each foot of the user follows a predetermined closed path having a preferred anatomical pattern.

2. The exercising device according to claim 1 wherein said camming portion comprises a curved profile.

3. The exercising device according to claim 1 wherein said camming portion comprises an upwardly sloped profile.

4. The exercising device according to claim 1 wherein said coupler member attaching means comprises:

a first element attached at one end to said pulley proximate said pivot axis and at its other end to said second end of said first reciprocating member; and a second element attached at one end to said pulley proximate said pivot axis and at its other end to said second end of said second reciprocating member.

5. The exercising device according to claim 1 wherein said first element comprises means to adjust the length of said first element between said pivot axis and said second end of said first reciprocating member, and said second element comprises means to adjust the length of said second element between said pivot axis of said second end of said second reciprocating member.

6. The exercising device according to claim 1 wherein said frame further comprises a top portion adapted to provide hand support for the user of the device.

7. The exercising device according to claim 1 wherein said device further comprises means for introducing a resistive force to said pulley so rotation of said pulley becomes progressively more difficult.

8. The exercising device according to claim 1 wherein said device further comprises means for reciprocating the arms of the user in conjunction with the motion of the feet of the user.

* * * * *